Sept. 29, 1959    E. G. BAKER ET AL    2,906,692
CATALYTIC CRACKING
Filed July 22, 1955
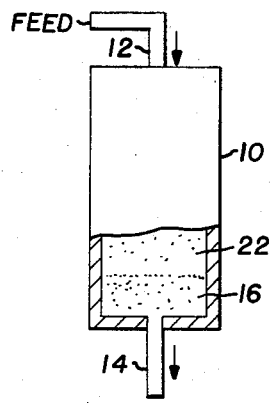
FIG.-1
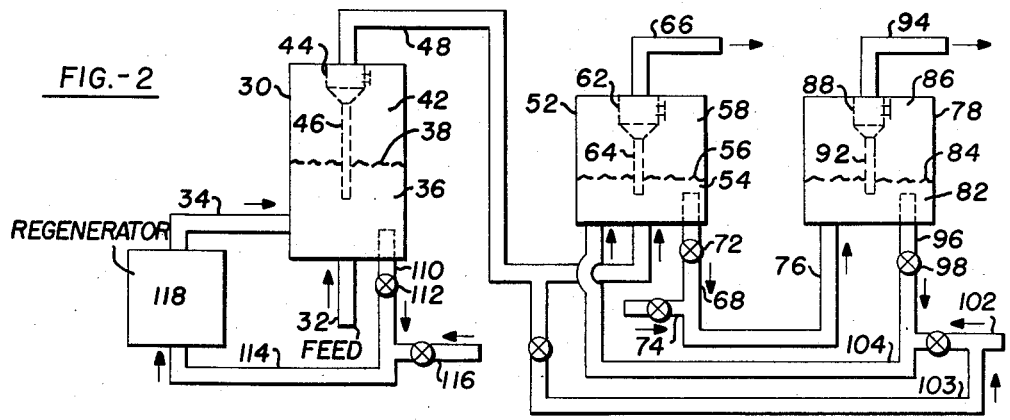
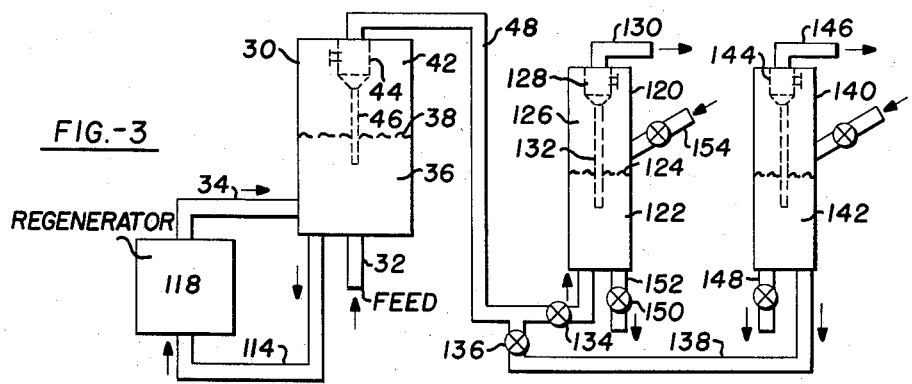
Edward G. Baker
Isidor Kirshenbaum    Inventors
By   *Serge J. Sichary*   Attorney

United States Patent Office 2,906,692
Patented Sept. 29, 1959

2,906,692

CATALYTIC CRACKING

Edward G. Baker, Summit, and Isidor Kirshenbaum, Union, N.J., assignors to Esso Research and Engineering Company, a corporation of Delaware Application July 22, 1955, Serial No. 523,646

7 Claims. (Cl. 208—74)

This invention relates to catalytic cracking and more particularly relates to a process for cracking gas oil to increase the gasoline yield without an appreciable loss in octane number as compared to conventional processes.

According to the present invention a catalyst system is provided which is nearly twice as active as commercial silica-alumina catalyst containing about 13% alumina. In addition, with the present invention the yield of $C_5+$ gasoline is increased by nearly 20%.

More specifically according to the present invention the hydrocarbon oil such as gas oil to be cracked is first passed over commercial silica-alumina catalyst or other cracking catalyst and the total cracked products are then passed over activated carbon catalyst. The volume of the activated carbon catalyst will represent preferably 10 to 30% of the total catalyst holdup in both the first reaction zone containing the silica-alumina catalyst and the second reaction zone containing the activated carbon catalyst. In one form of the invention the silica-alumina or other cracking catalyst forms the top larger layer and the activated carbon forms the lower smaller layer in a fixed bed reactor.

In another form of the invention the total hot cracked products from conventional catalytic cracking units at high feed rates are contacted with activated carbon in an auxiliary reactor, such as a standpipe type reactor, transfer line reactor, counter-current dilute phase reactor or other form of reactor to produce additional cracking. A counter-current dilute phase reactor is a reactor in which the catalyst moves down-flow by gravity, counter-current to the hot feed flowing upward. In transfer line reactors the flow is concurrent and in the standpipe type reactor a dense phase of catalyst moves down counter-currently to the upflowing hot feed. In all of these reactors relatively short contact times can be obtained if desired, although the range of contact times varies with reactor design. During such additional cracking, coke or carbonaceous material is laid down on the activated carbon. The coked activated carbon may be regenerated in any suitable manner, as by passing steam at 1200–1400° F. through the catalyst bed in a direction opposite to the process flow, or it may be discarded or burned for fuel purposes. When using fluid catalyst, the silica-alumina catalyst particles are maintained as a dense fluidized bed in the first reactor and the activated carbon particles are maintained as a dense fluidized bed in a second separate reactor. However, the silica-alumina or cracking catalyst bed and the activated carbon catalyst bed may be maintained as separate beds in a single reactor vessel.

By using the two catalysts as described, the amount of carbon deposited on the regenerable silica-alumina catalyst for a given conversion of gas oil will be about 10 to 30% less than in the case of conventional catalytic cracking operation. This is especially true in fixed bed operation where it was observed that much more coke was formed on the catalyst near the outlet end of the reactor, i.e., the section containing the activated carbon, than is formed on the silica-alumina catalyst, which forms the upper part of the catalyst bed (near the inlet end of the reactor).

According to the present invention, it is necessary for the oil feed which is to be cracked to be contacted first with the silica-alumina or other cracking catalyst, and then with the activated carbon catalyst, and further, the amount of silica-alumina or cracking catalyst should be greater than the amount of activated carbon. If the procedure is reversed and the oil feed stock is contacted with the activated carbon first and then with the silica-alumina catalyst, a low yield of gasoline of low octane number is obtained. Instead of using activated carbon alone in the second stage, activated carbon impregnated with alumina or carbon impregnated with silica may be used.

The present invention is adaptable to operation with fluid catalyst, fixed bed or moving bed catalyst cracking units. In place of synthetic silica-alumina catalyst, other cracking catalysts such as silica-magnesia, silica-alumina-magnesia, silica-alumina-zirconia, alumina-boria, silica-alumina-boria, acid-activated clays, etc. may be used. Activated carbons such as activated cocoanut shell charcoal, highly active Chemico coke, activated carbon made from coke produced in a fluid coking process etc. may be used.

In the drawings:

Fig. 1 diagrammatically represents a fixed bed reactor adapted for use in carrying out the present invention;

Fig. 2 diagrammatically represents a fluid solids unit where the activated carbon is passed to a regeneration zone or burner for regenerating and heating the activated carbon; and Fig. 3 diagrammatically represents another form of the invention utilizing two or more activated carbon fluid units useful for disposing of one reactor load of spent activated carbon while utilizing another reactor.

Referring now to Fig. 1 of the drawings, the reference character 10 designates a reaction vessel provided with a fluid inlet line 12 and a product outlet line 14. In the lower portion of the reaction vessel 10 there is provided a layer 16, of activated carbon catalyst. Arranged above the activated carbon catalyst is a layer of another cracking catalyst 22 such as silica-alumina catalyst which practically fills the rest of the reaction vessel 10. The catalyst is preferably in the form of cylindrical pills of a size of about 3/16 x 3/16 of an inch. As shown in the drawing the silica-alumina cracking catalyst has a volume about 4 times that of the volume of the activated carbon catalyst.

The hydrocarbon oil to be converted is heated to cracking temperature and introduced through line 12 which opens into the top part of the reaction vessel 10 and first contacts the larger volume of the silica-alumina or other cracking catalyst. The total products of conversion are then passed downward through the layer 16 of activated carbon catalyst and the total vaporous cracked products are removed at the bottom of the reaction vessel through outlet line 14. The temperature during the conversion operation may be between about 850° and 1000° F., the hydrocarbon oil to be converted is passed through the reaction vessel 10 at a space velocity of between 1 and 16 v./v./hr. (volume of liquid oil to volume of catalyst per hour), preferably 2–8 v./v./hr.

Referring now to Fig. 2 there is shown a system utilizing fluidized catalyst for carrying out the present invention. The main reaction vessel 30 is provided with a feed inlet line 32 which introduces the preheated oil feed into the bottom of the reaction vessel 30. The oil to be converted may be any relatively high boiling oil such as gas oil or other high boiling oils which are to be converted into lower boiling oils such as gasoline. In the fluid operation the catalyst is used as a finely divided solid having a particle size between about 200 and 400 mesh or finer with most of the particles being between about 20 and 80 microns in size. The silica-alumina catalyst is a synthetically prepared one containing about 13% alumina. Other cracking catalysts may be used. Silica-alumina cracking catalysts are commercially available and are generally prepared by reacting sodium silicate with sulfuric acid to form first silica hydrosol and then the silica hydrogel to which aluminum sulfate is added. Thereafter the aluminum is precipitated as a hydroxide by treating the mixture with ammonia. The silica-alumina hydrogel is washed and dried and calcined and is then ready for use.

The catalyst and oil can be mixed and passed to the reactor 30 and the catalyst to oil ratio may be between about 4 and 15. The temperature during conversion or cracking is between about 850° and 1000° F. A sufficient amount of hot regenerated catalyst is introduced into the reaction vessel 30 through line 34 to supply the heat of cracking. The vaporized oil feed is passed upwardly through the finely divided catalyst in the reaction vessel 30 to produce a dense fluidized turbulent bed 36 of catalyst having an upper level indicated at 38. Superficial velocity of the vapors and gases passing upwardly through the bed of catalyst 36 may be between about 0.5 and 10 feet per second, preferably 1–5 ft. per second. If desired a distribution grid may be provided at the bottom of the vessel 30 to distribute the incoming vapors across the area of the bottom of the fluidized bed 36.

The converted vaporous products leave the dense bed 36 and pass up through the dilute or disperse phase 42 and then pass into a dust separating means such as one or more cyclone separators 44 arranged within the reaction vessel 30. The solids which are separated in the cylone separator 44 are returned to the dense fluidized bed 36 through dip pipe 46. The vaporous reaction products leave the cyclone separator 44 through line 48 and are then passed into a second or auxiliary reaction zone 52 which is smaller than the first reaction vessel 30 and which contains a different catalyst. The auxiliary reaction zone 52 is shown as dense fluidized bed reactor similar to the reaction vessel 30 but it may be a standpipe reactor, a counter-current dilute phase reactor, or it may be a transfer line reactor wherein the solids and the vapors pass up through the tarnsfer line reactor at a relatively high velocity and at substantially the same rate.

The catalyst in the auxiliary reactor 52 consists of activated carbon which is also commercially available.

Activated carbon is a highly porous material having a high surface area and it may be manufactured in many ways but primarily the activated carbon is made by heating solid carbonaceous material to a rather high temperature between about 1000° F. and 2000° F., preferably 1200° F.. to 1600° F., in the presence of steam or carbon dioxide or flue gases with or without air. The activated carbon is finely divided and has a size between about 200 and 400 mesh with most of the particles being between about 20 and 80 microns. The total hot conversion or cracked products from line 48 are passed upwardly through the finely divided activated carbon to form a dense fluidized turbulent bed 54 having a level indicated at 56. Above the dense bed 54 is a dilute or disperse phase 58 in which the concentration of solid particles is relatively small.

The temperature in the auxiliary reaction vessel 52 is maintained between about 850° and 1000° F. and the upward superficial vapor velocity is between about 0.5 foot per second and 10 feet per second. The amount of activated carbon catalyst in reaction vessel 52 is about ¼ the volume of the silica-alumina catalyst in the first vessel 30. The cracked vapors pass through the cyclone separator 62 to separate entrained solid particles from the cracked vapors and the separated solids are returned to the dense fluidized bed 54 through dipleg 64. The cracked or converted vapors are taken overhead through line 66 and are passed to a fractionator or the like to recover desired products including gasoline.

During the cracking operation in the auxiliary reaction zone 52 some coke or carbonaceous material is laid down on the particles of activated carbon catalyst and the latter may then be regenerated and reused, or may be discarded and replaced by fresh activated carbon. To regenerate the activated carbon catalyst particles they are withdrawn from the dense bed through standpipe 68 having a control valve 72 and a gas such as steam, $CO_2$, flue gas or the like is introduced into the lower portion of the standpipe 68 through line 74 to make a less dense suspension which is passed through transfer line 76 to the regenerator or reactivator 78. Preferably steam is used at a temperature between about 1200° F. and 1700° F. and small amounts of air may be included to burn a part of the carbon or coke and thus supply heat for regeneration.

In general, shorter times of reactivation will be required at the higher temperatures. The steam or other activating gas passing upwardly through the regeneration zone 78 will maintain the activated carbon as a dense fluidized turbulent bed 82 having a level indicated at 84 with a dilute phase 86 thereabove. The superficial velocity of the gases passing upwardly through the regeneration zone 78 will be between about 0.5 and 5 feet per second. The hot regeneration gases leaving the dense bed 82 are passed through cyclone separator 88 to recover entrained solids. The separated solids are returned to the dense bed 82 through dip leg 92. The separated hot regeneration gases pass overhead through line 94 and may be passed to heat exchangers or boilers to recover heat therefrom.

The hot regenerated activated carbon is withdrawn from the dense bed 82 through standpipe 96 having a valve 98 and mixed with an inert gas such as $H_2$, $CO_2$ or steam introduced through line 102 or preferably with the hot cracked products from line 48 passing through line 103 and then line 102. The less dense suspension thus formed is passed through line 104 into the lower portion of the auxiliary reaction vessel 52 to supply heat to the auxiliary vessel and also to supply regenerated activated carbon to the reaction vessel 52. If necessary, fresh activated carbon may be added either to the reaction zone 52 or the regeneration vessel 78 as make-up catalyst. If the regeneratiton is carried out at about 1200° to 1600° F. in regeneration zone 78, the hot regenerated activated carbon particles are cooled down to about 900° to 1000° F. by indirect heat exchange with fresh oil feed, water, etc. (not shown) before being returned to reaction vessel 52.

The first reaction vessel 30 is provided with a standpipe 110 for withdrawing silica-alumina or cracking catalyst containing coke or carbonaceous deposits. Standpipe 110 is provided with valve 112. Air is introduced into line 114 through line 116 below valve 112 to supply the oxidizing medium for regenerating the silica-alumina or cracking catalyst. The regeneration vessel is diagrammatically shown at 118 and return of the hot regenerated catalyst to the reaction vessel 30 is shown as being done by means of line 34. During regeneration the temperature is maintained between about 900° and 1100° F. and in the fluid unit shown in Fig. 2 the regeneration of the catalyst is also preferably carried out as a dense fluidized mixture. The superficial velocity of the oxidizing gas passing upwardly through the regeneration zone 118 is maintained between about 0.5 and 5 feet per second to maintain the silica-alumina or cracking catalyst particles in a dense fluidized turbulent bed similar to the dense fluidized bed 36 shown in the first reaction vessel 30.

The modification shown in Fig. 3 is similar to that shown in Fig. 2 as far as the main cracking vessel is concerned. The same reference characters are used to indicate the same parts in the first cracking or reaction vessel shown in Figs. 2 and 3. The total cracked or converted products passing overhead through line 48 are introduced into the bottom of an auxiliary reactor 120 and the superficial velocity of the vaporous products passing upwardly through the auxiliary reaction vessel 120 is between about 0.5 and 10 feet per second to maintain the activated carbon catalyst particles as a dense fluidized turbulent bed 122 having a level indicated at 124 and a dilute phase and a disperse phase 126 thereabove. The converted vaporous products containing entrained solids are passed through cyclone separator 128 and separated vapors are taken overhead through line 130 and passed to a fractionator or other separation equipment to recover desired products including gasoline. The separated solid particles are returned to dense fluidized bed 122 through dipleg 132. Here again the amount of activated carbon in the dense fluidized bed 122 is about ¼ the volume of the dense fluidized bed 36 of silica-alumina catalyst in the first reaction vessel 30.

After the activated carbon in reaction vessel 120 has been in use for some time there is a deposit of carbonaceous material or coke on the activated carbon and its activity is decreased. In the form of the invention shown in Fig. 3, valve 134 in line 48 is closed and valve 136 in line 138 is opened and the hot cracked vapors from line 48 are passed through a second auxiliary reaction vessel 140 similar to the first auxiliary vessel 120 and also containing activated carbon and having a dense fluidized bed indicated at 142. Auxiliary vessel 140 also has a cyclone separator 144 and vapor product withdrawal line 146. A valve line 148 is provided for withdrawing spent activated carbon from the vessel 140.

When the flow of cracked vaporous products is stopped by shutting off valve 134, the spent activated carbon from the first auxiliary vessel 120 is removed by opening the valve 150 in standpipe 152 and the withdrawn activated carbon may be burned as a fuel or may be discarded from the process. The auxiliary vessel 120 is then replenished by adding fresh activated carbon through line 154. Thereafter, when the activated carbon catalyst in the second auxiliary vessel 140 becomes spent, valve 136 is closed, valve 134 in line 48 is opened and the cracked products are again passed through the first auxiliary reaction vessel 120. Thereafter the spent catalyst is removed from the second auxiliary vessel 140 and replaced by fresh activated carbon. The temperature during cracking in the reaction vessel 120 is substantially the same as that given for the auxiliary vessel 52 in the description of the modification shown in Fig. 2. Also the amount of activated carbon catalyst in the dense bed 122 in the auxiliary reaction vessel 120 is about ¼ that of the silica-alumina catalyst in the dense bed 36 in the first reaction vessel 30.

The hydrocarbon oil feed to be cracked according to this invention is preferably a gas oil fraction but other fractions may be used such as residual and fuel oil blends, shale oils, cycle stocks, etc.

The following data in Table 1 compare the results obtained by cracking East Texas light gas oil feed with commercially available silica-alumina cracking catalyst alone, activated carbon alone and then according to this invention where the catalyst bed is made up of a larger portion of commercial silica-alumina catalyst and the rest activated carbon. The oil feed is passed over the silica-alumina catalyst first and then over the activated carbon. The catalysts are maintained as fixed beds and in this example both catalysts were in one reactor.

TABLE I

Cracking over $SiO_2$—$Al_2O_3$ and activated coconut shell carbon

[ETLGO feed, 950° F., 30 minute cycle]

LARGE TEST UNIT

| Reactor bed composition | $80SiO_2$—$Al_2O_3$, 20 act. carbon | $SiO_2$—$Al_2O_3$ | Activated carbon |
|---|---|---|---|
| Feed rate, w./hr./w. | 4.65 | 2.50 | 8.0 |
| 430° F. conversion, weight percent | 56.8 | 56.8 | 56.8 |
| Yields, weight percent on feed: | | | |
| $C_5$+ gasoline | 37.7 | 32.0 | 38.0 |
| $C_4$ | 7.9 | 11.7 | 4.3 |
| $C_3$-gas | 7.6 | 9.5 | 9.0 |
| Carbon on $SiO_2$—$Al_2O_3$ | 2.2 | 3.6 | |
| Carbon on coke | 1.4 | | 5.5 |
| $C_5$+ gasoline: | | | |
| Research octane number | 90 | 95 | 65 |
| Percent sulfur | 0.02 | 0.03 | |

An examination of the above data shows that the process of the present invention produces a catalyst system which is nearly twice as active as commercial silica-alumina catalyst. Moreover the yield of $C_5$+ gasoline is increased by nearly 20%. There is a corresponding reduction in degradation of the gas oil feed to dry gas. It will also be noted that about 40% of the total coke that is made is deposited on the activated carbon component, even though the latter accounts for only 20% of the total catalyst system. For the same conversion less carbon or coke is laid down on the silica-alumina catalyst in this invention than in the conventional process. While the octane number of the gasoline produced according to this invention is somewhat lower than that obtained when using commercial silica-alumina catalyst, it is 25 points higher than that obtained when using activated carbon alone. It is also noted that the sulfur in the gasoline is significantly lower when produced according to this invention than when produced using commercial silica-alumina catalyst. Accordingly the lead sensitivity of the gasoline of our invention is greater than that of the conventionally cracked gasoline. If desired, the catalytic heavy naphtha may be separated from the cracked products and hydroformed to increase the octane number and further reduce the sulfur.

As pointed out above, the present invention consists in passing the gas oil feed first over silica-alumina or other cracking catalyst and then over the activated carbon. Reversing the order of these cracking steps, that is, passing the oil feed over activated carbon first and then over silica-alumina cracking catalyst, leads to inferior product distribution and low octane number gasoline. Data are presented in the next table which also demonstrate the dependence of gasoline octane number on the relative amounts of each catalyst type present in the overall cracking catalyst system.

TABLE 2

*Downflow cracking over $SiO_2$—$Al_2O_3$ and activated carbon*

[ETLGO feed, 900–925° F., 30 minute cycle.]

SMALL TEST UNIT

| Reactor Bed Composition | 50 carbon, 50 $SiO_2$—$Al_2O_3$ | 50 $SiO_2$—$Al_2O_3$, 50 carbon | This invention 80($SiO_2$—$Al_2O_3$), 20 carbon | $SiO_2$—$Al_2O_3$ |
|---|---|---|---|---|
| Feed rate, w./hr./w | 2.74 | 8.0 | 5.5 | 1.0 |
| 430° F. conversion, weight percent | 65 | 65 | 65 | 65 |
| Yields, weight percent on feed: | | | | |
| $C_5$+ gasoline | 29.7 | 40.5 | 38.5 | 31.0 |
| $C_4$ | 7.5 | 7.0 | 9.0 | 13.5 |
| $C_3$-gas | 13.1 | 11.0 | 11.0 | 13.0 |
| Total carbon | 14.7 | 6.5 | 6.5 | 7.5 |
| $C_5$+ gasoline: Research octane number | 72 | 79 | 90 | 95 |

Additional work has been done using activated carbon in cracking of higher boiling hydrocarbons to produce lower boiling hydrocarbons and it has been found that to obtain the maximum quality in cracked gasoline products the composition of the cracking catalyst and the depth of conversion must be controlled. In this phase of the work the activated carbon base was promoted or impregnated with metal oxides such as alumina and silica.

The alumina promoted activated carbon catalysts were prepared by vacuum impregnating the active carbon base with solutions of aluminum nitrate at a temperature of 50–75° C. The hydrated aluminum salt

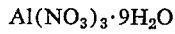

$$Al(NO_3)_3 \cdot 9H_2O$$

had been dissolved in its water of crystallization by heating on a steam bath.

After the impregnation, the catalyst was filtered, air-dried, washed once with water, dried at 400° F. for 3–5 hours, and soaked in dilute (1:1) $NH_4OH$ solution for about one hour.

The catalyst was again filtered, washed 3 to 4 times with water, dried at 400° F. and activated in air for 3 hours at 850° F. With each catalyst, the desired amount of $Al_2O_3$ was introducd as $Al(NO_3)_3 \cdot 9H_2O$.

TABLE 3

*Cracking over $Al_2O_3$-carbon (activated cocoanut shell) catalysts*

[ETLGO feed, 900–925° F., 30 minute cycle.]

SMALL TEST UNIT

| Catalyst base | Activated carbon | | | $SiO_2$—$Al_2O_3$ |
|---|---|---|---|---|
| Weight percent additive | 10$Al_2O_3$ | 20$Al_2O_3$ | 40$Al_2O_3$ | |
| W./hr./w | 3.30 | 4.0 | 4.92 | <1.0 |
| 430° F. conversion, weight percent | 76.2 | 75.0 | 73.5 | 75 |
| Yields, weight percent on feed: | | | | |
| $C_5$+ gasoline | 46.3 | 41.8 | 41.7 | 35 |
| $C_4$ | 4.3 | 8.0 | 6.0 | 12 |
| $C_3$-gas | 16.3 | 15.2 | 15.0 | 16 |
| Carbon | 9.3 | 10.0 | 10.8 | 12 |
| $C_5$+ gasoline: Research octane number | 60 | 90 | 86 | 95 |

The data in the Table 3 show that an activated carbon containing more than 10% of alumina produces a high quality naphtha or high octane number gasoline from the cracking process. More specifically it will be seen from the data that when at least 20% alumina is included in the activated carbon base, a $C_5$+ gasoline is produced having an octane number of about 90 even without the use of the first bed of oxide cracking catalyst. While the octane number is lower than that for gasoline produced by using commercial silica-alumina catalyst, it will be seen that much more $C_5$+ gasoline is produced, less $C_4$ hydrocarbons are produced and less coke is produced for the 20% alumina-activated carbon catalyst than with the commercial silica-alumina catalyst. Also the 20% alumina-activated carbon catalyst is more than 4 times as active as commercial silica-alumina catalyst. Using such an alumina-activated carbon catalyst in place of the activated carbon beds of Figs. 1–3 will result in a markedly superior process giving a high yield of high octane number gasoline. When using alumina or silica promoted activated carbons, they are used in an amount about one-fourth of the volume of the total catalyst system.

The activated carbon can also be promoted with silica. Additional data are included in the following Table 4 to show the dependence of gasoline quality on the depth of conversion when using silica with the activated carbon.

The 30$SiO_2$—70C catalyst in this table was prepared by impregnating 100 gm. of activated carbon with 156 cc. of ethyl ortho silicate (43 g. of $SiO_2$). This amount of impregnant just wet the carbon base, and the system was allowed to stand for 16 hours before air drying. The catalyst was evacuated and then treated with an excess of diluted (1:1) $NH_4OH$ solution by heating at 100–200° F. The catalyst was filtered, air dried and heated at 400° F. for 3–5 hours, after which it was activated in air for 3 hours at 850° F.

TABLE 4

*Cracking over $SiO_2$-activated carbon (cocoanut shell) catalysts*

[ETLGO feed, 900–925° F., 30 minute cycle.]

SMALL TEST UNIT

| Catalyst base | Activated carbon | | $SiO_2$—$Al_2O_3$ |
|---|---|---|---|
| Weight percent $SiO_2$ | 30 | 30 | |
| W./hr./w | 8.35 | 4.70 | 1.0 |
| 430° F. conversion, weight percent | 65.1 | 84.8 | 65 |
| Yields, weight percent on feed: | | | |
| $C_5$+ gasoline | 42.3 | 39.4 | 32 |
| $C_4$ | 3.8 | 9.4 | 12 |
| $C_3$-gas | 11.0 | 22.6 | 13 |
| Carbon | 8.0 | 13.7 | 8 |
| $C_5$+ gasoline: Research octane number | 60 | 88 | 95 |

The data in the above Table 4 show that in the case of activated carbon catalysts containing 30% silica a high quality gasoline is produced at a conversion level greater than 65%. In the absence of the first bed of metal oxide cracking catalyst as described in Figs. 1–3, the conversion level must be about 85% to give a gasoline with an octane number 88.

While the present invention has been described for the cracking of gas oils and the like, it can also be utilized in hydrocracking of heavy oil fractions. In hydrocracking the heavy oil feed such as gas oil is heated to between about 750° and 1100° F., and maintained under a pressure between about 100 and 500 p.s.i.g. The amount of hydrogen used is between about 500 and 10,000 cubic feet per barrel of oil feed. The catalyst is one containing between 8 and 16% molybdenum oxide on silica-alumina, the silica-alumina comprising about 87% silica and 13% alumina. The feed rate of oil is between about 0.5 and 1.0 v./v./hr.

The entire hot hydrocracked products may then be passed over activated carbon or activated carbon promoted with alumina or silica prepared according to the present invention and further cracked at a temperature between about 850° and 1000° F. If desired, some of the hydrogen may be removed before passing the hydrocracked products over the activated carbon or promoted activated carbon. Preferably the hot entire hydrocracked products have their pressure reduced to slightly above atmospheric before being passed over the activated carbon or promoted activated carbon, but this is not necessary. As pointed out above, the amount of activated carbon or promoted activated carbon should be about one-fourth the volume of the total catalyst system when adapting the present invention to hydrocracking.

What is claimed is:

1. A method of cracking gas oil to produce gasoline which comprises contacting, in a first stage, hot gas oil vapors with a relatively large amount of silica-alumina cracking catalyst at a cracking temperature above about 850° F. and then further cracking the total vaporous reaction products from said first stage, without condensation, in a second stage by contacting them with activated carbon catalyst at a cracking temperature above about 850° F., the activated carbon catalyst being about one-fourth the volume of said silica-alumina catalyst.

2. A method of cracking hydrocarbon gas oils to produce motor fuels which comprises passing gas oil in contact first with a silica-alumina cracking catalyst maintained at a temperature above about 850° F. to effect cracking of the gas oil and then passing the total cracked products, without condensation, in contact with a smaller amount of activated carbon catalyst maintained at a temperature above about 850° F. to effect additional cracking of the gas oil so that less coke is laid down on the silica-alumina catalyst for the degree of conversion obtained than would be obtained if no activated carbon cracking step were used, the amount of activated carbon catalyst being about one-fourth the volume of said silica-alumina catalyst.

3. A method according to claim 2 wherein the cracking temperature during cracking in said cracking steps is maintained between about 850° and 1000° F.

4. A process according to claim 2 wherein said silica-alumina cracking catalyst and said activated carbon catalyst are arranged in a single contacting zone and are so arranged that the gas oil to be cracked contacts said silica-alumina cracking catalyst first.

5. A process according to claim 2 wherein said silica-alumina cracking catalyst is in said first contacting step and said activated carbon catalyst is in a separate second contacting zone.

6. A method of cracking higher boiling hydrocarbons to lower boiling gasoline hydrocarbons which comprises passing gas oil feed in contact first with a silica-alumina cracking catalyst at a cracking temperature to produce vaporous cracked products and then passing the total cracked vaporous products from the first stage, without condensation, for contact with activated carbon catalyst in a second stage while maintaining cracking conditions to further crack hydrocarbons, the volume of the silica-alumina catalyst being about 70 to 90% of the total catalyst system and recovering a high octane gasoline from the vaporous cracked products leaving said second stage.

7. A method according to claim 6 wherein the amount of silica-alumina catalyst forms about 80% of the total catalyst system.

References Cited in the file of this patent
UNITED STATES PATENTS

| | | |
|---|---|---|
| 2,428,715 | Marisic | Oct. 7, 1947 |
| 2,490,975 | Mathy | Dec. 13, 1949 |
| 2,618,613 | Kimberlin et al. | Nov. 18, 1952 |